Patented Dec. 10, 1929

1,738,660

UNITED STATES PATENT OFFICE

RICHARD METZGER, OF HEIDELBERG, GERMANY, ASSIGNOR TO GENERAL ANILINE WORKS, INC., OF NEW YORK, N. Y., A CORPORATION OF DELAWARE

PROCESS FOR DYEING CELLULOSE ACETATE SILK

No Drawing. Original application filed July 7, 1925, Serial No. 42,046, and in Germany July 11, 1924. Divided and this application filed September 27, 1927. Serial No. 222,397.

This application contains subject matter, which has been deleted from my copending application for Letters Patent, Ser. No. 42,046, filed July 7, 1925, with the express intention of filing this divisional application.

The present invention has for its object to provide for an improved process for dyeing cellulose acetate silk.

I have found that cellulose acetate silk can be dyed in a very excellent and improved manner with a great number of insoluble or difficulty soluble compounds when dyeing is carried out in the presence of sulfonated mineral oils which constitute mixtures of different sulfonic acids.

The compounds which dye with the aid of the aforesaid sulfonated mineral oils may be coloring matters or colored organic compounds in general, insoluble or difficultly soluble in water, as well as components of dyestuffs, such for example as amino compounds which afterwards are diazotized on the fibre and coupled with suitable components, or napthols or similar components which afterwards are to be developed with diazo compounds.

For dyeing, the compounds to be brought on the fibre may be first made into a concentrated solution or paste, generally of a colloidal nature, or otherwise finely dispersed in a concentrated form by an addition of sulfonated mineral oils either alone or in association with one or more of the so-called synthetic tans of the nature of phenol- (or cresol-) formaldehyde-sulfuric acid condensation products or phenol-sulfonic acid-sulfur condensation products, carbazol sulfonic acids, crude anthracene or other high tar hydro-carbon sulfonic acids, or sulfite cellulose waste liquor and the like, and a dye-bath prepared by diluting such concentrated preparations, or the dye-bath may be directly prepared with the compounds to be brought on the fibre while adding a sulfonated mineral oil, either alone or with the addition of a sulfonic acid of the aforesaid character.

As examples of coloring matters difficultly soluble in water, which may be employed for dyeing cellulose acetate silk in the manner hereinbefore described may be mentioned, for instance, the condensation product of 3-chlor-6-nitro-1-amino-benzene and formaldehyde (see U. S. Patent 932,266 dated August 22, 1909), 1.4 diamino-anthraquinone 1.4.5.8-tetra-amino-anthraquinone, 3-amino benzanthrone, Bz 1-amino benzanthrone corresponding to the formula

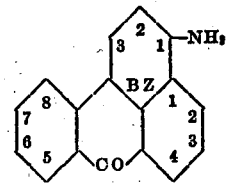

alpha-napthylamine (diaz)+meta-phenylene-diamine, alpha-amino-alpha-napthoquinone, 8-nitro-2-amino-napthalene, 5-nitro 1.4-diamino-anthraquinone, methyl violet base, alpha-naphthyl amine (diaz)+para-hydroxy benzoic acid.

The following example will serve to further illustrate my present invention which however is not restricted to this example.

Example

One third of an ounce of 1.4.5.8-tetra-amino-anthraquinone is dissolved in sulfonated mineral lubricating oil (in neutralized form) and diluted with about 5 gallons of water. 2 lbs. of cellulose acetate silk are dyed with this bath for three quarters of an hour at between 60 and 70° C. whereby a beautiful bright blue is produced.

What I claim is:

1. The process of producing dyeings on cellulose acetate silk, which comprises employing a substance, suitable for dyeing cellulose acetate silk, difficultly soluble in water, in conjunction with a sulfonated mineral oil.

2. The process of producing dyeings on cellulose acetate silk, which comprises employing a colored organic substance practically insoluble in water and suitable for dyeing cellulose acetate silk, in conjunction with a sulfonated mineral oil.

3. As a new article of manufacture, a preparation comprising, a substance difficultly soluble in water and suitable for dyeing cellulose acetate silk in admixture with a sulfonated mineral oil.

4. As a new article of manufacture, a preparation comprising a colored organic substance difficultly soluble in water and suitable for dyeing cellulose acetate silk, in admixture with a sulfonated mineral oil.

In testimony whereof I have hereunto set my hand.

RICHARD METZGER.